(12) United States Patent
Doll et al.

(10) Patent No.: US 9,950,380 B1
(45) Date of Patent: Apr. 24, 2018

(54) METHOD FOR FORMING A DUAL THREADED DIE

(71) Applicants: Mark Doll, Lincoln, CA (US); Zebula Doll, Lincoln, CA (US)

(72) Inventors: Mark Doll, Lincoln, CA (US); Zebula Doll, Lincoln, CA (US)

( * ) Notice: Subject to any disclaimer, the term of this patent is extended or adjusted under 35 U.S.C. 154(b) by 949 days.

(21) Appl. No.: 14/206,949

(22) Filed: Mar. 12, 2014

Related U.S. Application Data

(60) Provisional application No. 61/779,214, filed on Mar. 13, 2013.

(51) Int. Cl.
| | |
|---|---|
| B21H 3/06 | (2006.01) |
| B23H 5/04 | (2006.01) |
| B23G 9/00 | (2006.01) |
| B21K 1/44 | (2006.01) |
| B21K 1/56 | (2006.01) |
| B23H 1/04 | (2006.01) |
| B23H 9/00 | (2006.01) |
| B24B 3/60 | (2006.01) |

(52) U.S. Cl.
CPC .............. B23H 1/04 (2013.01); B23H 9/003 (2013.01); B24B 3/602 (2013.01)

(58) Field of Classification Search
CPC . B21H 3/02; B21H 3/04; B21H 3/042; B21H 3/06; B21H 3/022; B21H 9/003; B23H 5/04; B23H 1/04; B23K 1/44; B23K 1/56; B23G 9/00; B24B 3/602

USPC ....... 219/69.11, 69.17; 411/413; 570/10, 66; 72/468–469, 474–475, 103; 470/10, 66

See application file for complete search history.

(56) References Cited

U.S. PATENT DOCUMENTS

| | | | | |
|---|---|---|---|---|
| 3,260,100 | A * | 7/1966 | Wieber | B21H 3/06 72/469 |
| 4,502,456 | A * | 3/1985 | Janutta | B23F 21/02 125/11.03 |
| 7,159,429 | B2 * | 1/2007 | Takemasu | B21H 3/02 470/10 |
| 2002/0192051 | A1 * | 12/2002 | LeVey | B21H 3/02 411/411 |
| 2013/0139386 | A1 * | 6/2013 | Lacy | F01D 11/001 29/888.3 |

* cited by examiner

*Primary Examiner* — Michael G Hoang

(57) ABSTRACT

An electric discharge machining electrode is shaped to form a die for roll forming a dual threaded screw. The electrode is oriented with a face thereof adjacent to a forming surface of the die and placed within an electric discharge machine to cause electric discharge via the electrode to the forming surface of the die, to shape the die to have the geometry required for roll forming of the dual threaded screw. The EDM electrode face has a plurality of troughs and tips substantially matching coarse threads of the screw. Grooves are formed in the tips. The grooves are angled relative the tips and have a geometry substantially matching the fine threads of the screw. The face of the electrode has a form which shapes the forming surface of the die so that the die can roll form the dual threaded screw.

11 Claims, 8 Drawing Sheets

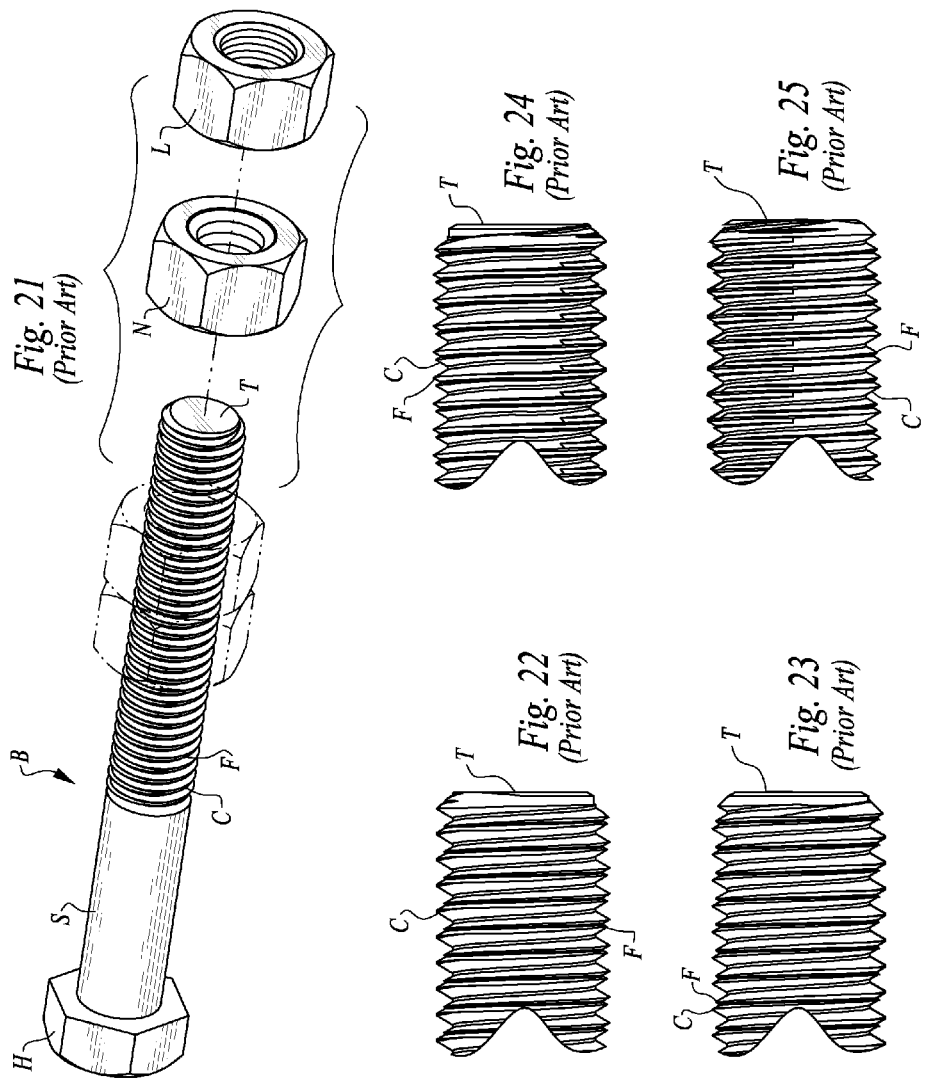

METHOD FOR FORMING A DUAL THREADED DIE

CROSS-REFERENCE TO RELATED APPLICATIONS

This application claims benefit under Title 35, United States Code § 119(e) of U.S. Provisional Application No. 61/779,214 filed on Mar. 13, 2013.

FIELD OF THE INVENTION

The following invention relates to methods for forming dies and particularly dies for use in roll forming of screws. More particularly, this invention relates to electric discharge machining (EDM) of roll forming dies and associated electrodes for EDM machines which can form a die with a forming surface suitably shaped to roll form a dual threaded screw.

BACKGROUND OF THE INVENTION

Screws come in a variety of different configurations generally including threads on a portion of a substantially cylindrical shaft which extends between a head and a tip. One form of screw is configured for use along with a nut or other structure having a threaded hole, which nut threads mate with threads on the screw so that the nut or other threaded structure can be coupled to the screw by simultaneously rotating and translating the shaft into and through the hole in the nut or other threaded hole. When a screw is configured for use with a nut it is often referred to as a bolt.

The threads on the shaft of the screw have a variety of characteristics. Some of these characteristics include a pitch angle which is an angle at which the threads are oriented relative to a plane perpendicular to a central axis of the shaft of the screw. The greater the pitch angle, the greater the axial distance that a nut will travel when rotated a similar number of turns. Another characteristic of threads is their size, such as measured between a minor diameter and a major diameter of the threads. Threads which are generally larger are often referred to as "coarse threads" while threads which are relatively smaller are often referred to as "fine threads." When adjacent turns of threads are directly adjacent to each other, and when a diameter of the shaft of the screw is known, the pitch angle of the threads and the relative size of the threads become linked together. Coarser threads will have a greater pitch angle and finer threads will have a lesser pitch angle if the diameter of the shaft remains the same and if the threads of adjacent turns are provided without a space therebetween.

One unique type of screw is known in the prior art as a dual threaded screw. Generally, a dual threaded screw has both a coarse thread with a relatively large pitch angle and at least portions of a fine thread having a lesser pitch angle formed on the same screw. Such a dual threaded screw is described in U.S. Pat. No. 7,159,429, incorporated herein by reference in its entirety. A dual threaded bolt B providing one example of such a dual threaded screw is shown herein in FIGS. 20-25. A unique aspect of such a dual threaded bolt B is its ability to have nuts N, L having threads of different pitches both threaded onto the same bolt B with the first nut N providing a basic fastening function, and the second nut L being tightenable against the first nut N to act as a lock nut to keep the nuts N, L from moving relative to the bolt B.

Screws can be manufactured in a variety of different ways including machining of the threads, turning of the threads on a lathe or rolling of the threads between dies. Often, rolling threads onto a screw is the most efficient screw thread forming method. However, dual threaded screws do not lend themselves to straightforward roll forming between appropriately threaded dies. In particular, if one utilizes coarse threaded dies and fine threaded dies, one can form the coarse threads onto the screw, but then when the fine threads are formed onto the screw with the fine threaded dies, the coarse threads are to some extent damaged. If the fine threads are first formed onto the shaft of the screw and then the coarse threads are formed, the dies forming the coarse threads will damage the fine threads.

It is taught in the above-identified U.S. Pat. No. 7,159,429 to provide a die having contours thereon which are appropriate to result in the formation of both the coarse thread and the fine thread, simultaneously onto the shaft of the screw. The particular geometry of such a roll forming die is described in U.S. Pat. No. 7,159,429.

While this die geometry for forming the dual threaded screw is disclosed in U.S. Pat. No. 7,159,429, this die geometry is rather complex and is of a character which makes forming of this die exceptionally difficult. This difficulty is enhanced when considering that materials from which roll forming dies are formed must be significantly harder than the material roll formed thereby. Because screws are typically formed of steel or other relatively hard materials, the dies must be formed of exceptionally hard material and yet must still have the complex geometry necessary to simultaneously form both coarse and fine threads.

Accordingly, a need exists for a method to form the complex geometry of a die suitable to roll form a dual threaded screw.

SUMMARY OF THE INVENTION

With this invention a method for forming a die with the geometry required for roll forming of a dual threaded screw is provided, along with unique equipment required for this die forming process. The die to be formed has a face which is typically flat and typically extending between a pair of leading primary edges on opposite sides of a forming surface thereof and with a pair of side edges extending between the two lead edges and also defining lateral edges of the forming surface. The forming surface of the die has a series of crests thereon which extend linearly like a series of parallel ridges between the two leading edges. Roots are provided between each of these crests, which also extend between the two leading edges. These crests and roots are angled relative to the side edges, in a preferred form of this invention, with an angle matching a coarse thread pitch angle for the dual threaded screw to be formed by the die.

Uniquely, the root between each crest is spanned by a plurality of bridges (which bridges act on the screw to form the fine threads). These bridges have a start on a side of a crest facing the root and a stop on a side of another tip also facing the same root. Each root has a plurality of bridges that span it, with the bridges parallel to each other and angled relative to an angle of the crests and roots. The bridges have an angle generally matching a desired pitch angle for the fine threads of the dual threaded screw to be formed by the die.

To form this unique geometry for the die, an electric discharge machining (EDM) electrode is first formed with a face shaped so that the electrode can be placed adjacent the forming surface of the dual threaded die and electric discharge from the EDM machine via the appropriately shaped electrode face causes the crest, root and bridge structures of the die to be formed as desired. In particular, the EDM electrode face has a pair of opposite primary edges and a pair of opposite side edges which provide boundaries for the face. The face includes a plurality of troughs and tips which each extend between the primary edges of the face. The troughs and tips are preferably angled to the side edges with an angle similar to a pitch angle of the coarse threads of the dual threaded screw to be formed by the die.

Each of the tips has a plurality of grooves (which form the bridges in the roots of the die) formed therein. Each groove includes a beginning at a first end thereof and an ending at a second end thereof. The beginning and ending are on opposite sides of each tip. These grooves have a depth similar to a height of the bridges to be formed within the roots of the die. Similarly, the troughs in the face of the EDM electrode have a depth similar to a height of the crests to be formed in the die. Overall, the contour of the face of the EDM electrode is such that after it has formed the contour of the forming surface in the die, the EDM electrode can be placed upon the forming surface of the die with the tips of the face in the EDM electrode extending into the roots in the die and with the bridges in the roots of the die extending into the grooves in the tips of the face of the EDM electrode, and otherwise with the contours of the EDM electrode and the contours of the forming surface of the die substantially touching each other throughout the face of the EDM electrode and the forming surface of the die.

The EDM electrode itself can have the troughs and tips therein formed by utilizing a coarse thread grinder, such as in the form of a rotating coarse drum brought into contact with the face of the EDM electrode. This drum has a plurality of coarse circumferential ribs and is preferably angled with a central axis thereof angled relative to side edges of the face at an angle matching the pitch angle of the coarse threads of the dual threaded screws to be formed by the die. Next, the grooves are formed in the tips on the face of the EDM electrode by utilizing a fine grinder having a drum having a plurality of fine circumferential ribs and which rotates and comes into contact with the face of the EDM electrode to cut the grooves into the tips in the face of the EDM electrode. The fine grinder is angled at an angle relative to the side edges which matches a pitch angle of the fine threads to be formed into the dual threaded screw by the die. After such grinding, the EDM electrode has the troughs, tips and grooves with the shape required to cause shaping (through the EDM process) of a die having a forming surface with the shape required for roll forming of dual threaded screws. While a pair of similar dies could be utilized for this roll forming process, typically it is beneficial to utilize a plain die having a shape similar to that of the dual threaded die, but with only the coarse threads formed thereon, generally corresponding with the roots and crests of the dual threaded die.

OBJECTS OF THE INVENTION

Accordingly, a primary object of the present invention is to provide a method for forming a die so that it can be used to roll form a dual threaded screw having both a coarse thread and a fine thread thereon.

Another object of the present invention is to provide an EDM electrode with the required shape to cause a forming surface of a dual threaded die to have a desired contour so that it can roll form dual threaded screws.

Another object of the present invention is to provide an efficient method for making a die suitable for roll forming a dual threaded screw and in turn efficiently forming dual threaded screws.

Another object of the present invention is to provide a method for forming a die which can roll form a high quality dual threaded screw.

Another object of the present invention is to provide a method for forming an EDM electrode with the face having a contour suitable for forming a dual threaded die capable of roll forming a dual threaded screw.

Other further objects of the present invention will become apparent from a careful reading of the included drawing figures, the claims and detailed description of the invention.

BRIEF DESCRIPTION OF THE DRAWINGS

FIG. 21 is a perspective view of that which is shown in FIG. 20 along with a pair of nuts having coarse and fine threads and both rotatably supportable upon the bolt.

FIGS. 22-25 are side elevation views of the coarse and fine threads which are formed into the bolt by the dual threaded die which is shaped by a method of this invention.

DESCRIPTION OF THE PREFERRED EMBODIMENT

Figure 1:
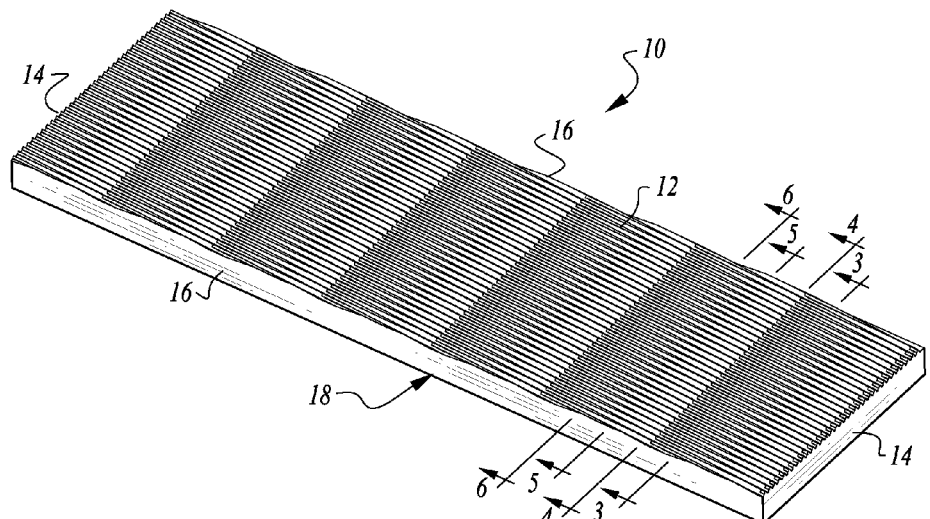
FIG. 1 is a perspective view of an EDM electrode for use in practicing a method for forming a dual threaded die according to this invention.
Figure 2:
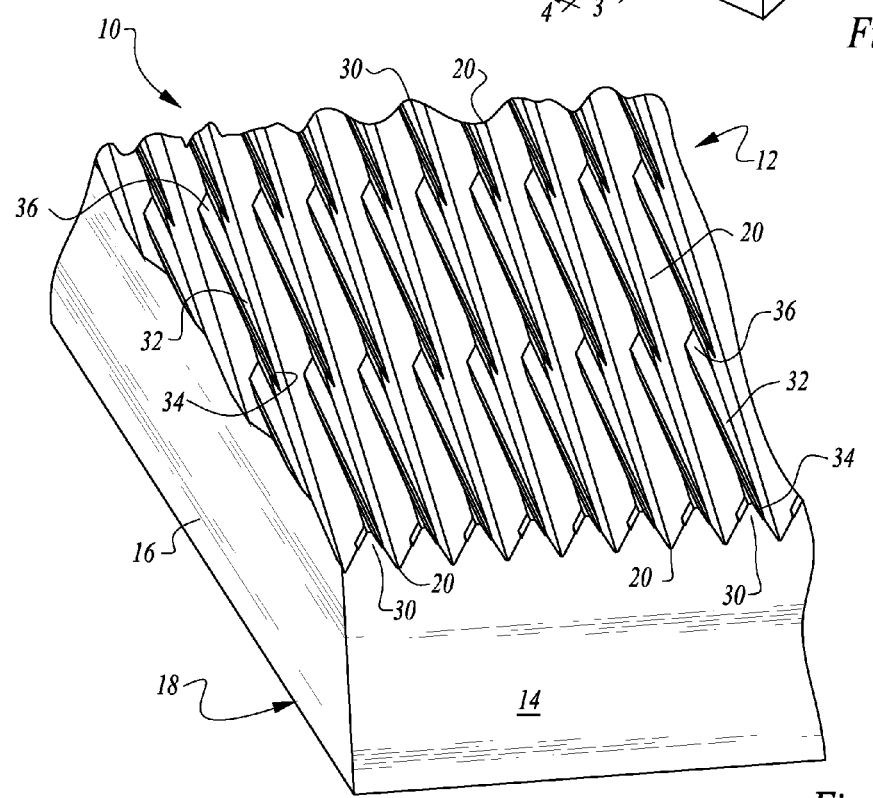
FIG. 2 is a detailed perspective view of a portion of that which is shown in FIG. 1.
Figure 3:
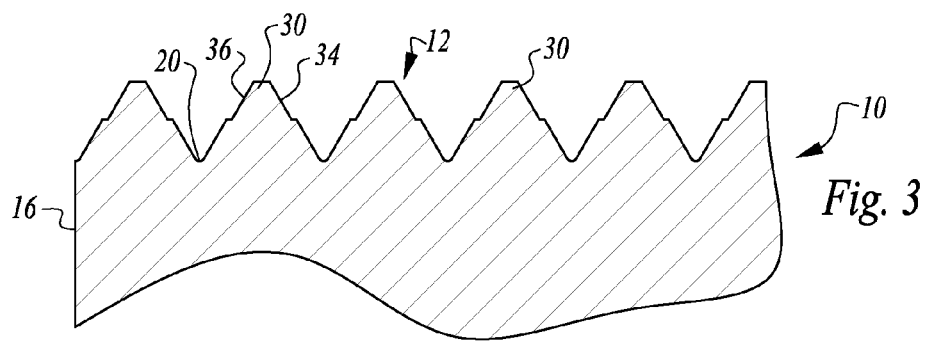
FIGS. 3-6 are sectional views of portions of that which is shown in FIG. 1, the views taken along corresponding lines of FIG. 1 and further revealing details of the contour of the face of the EDM electrode.
Figure 4:
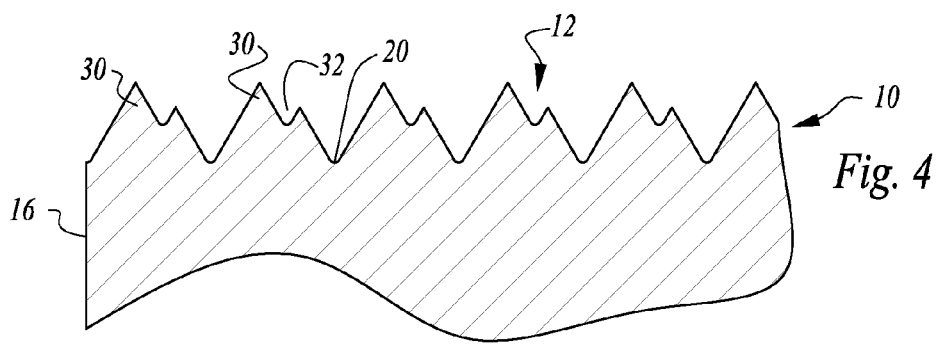
Figure 5:
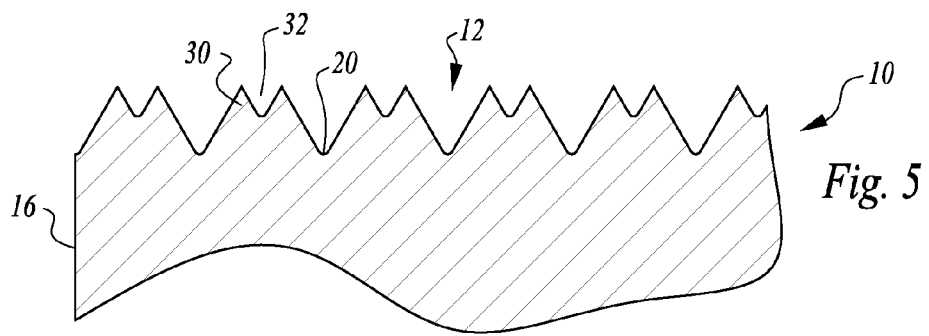
Figure 6:
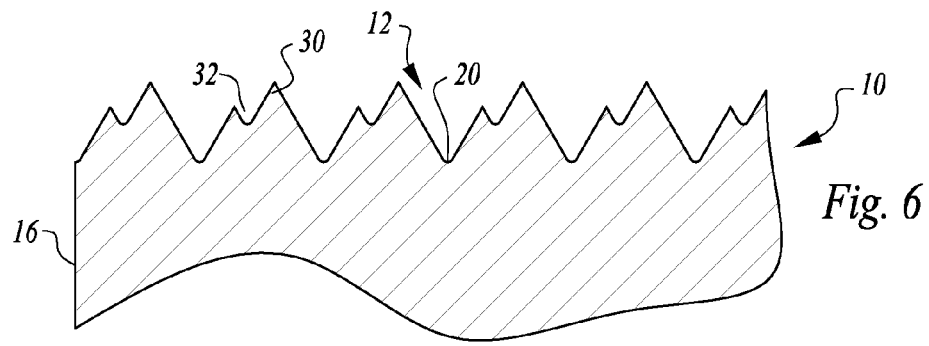
Figure 7:
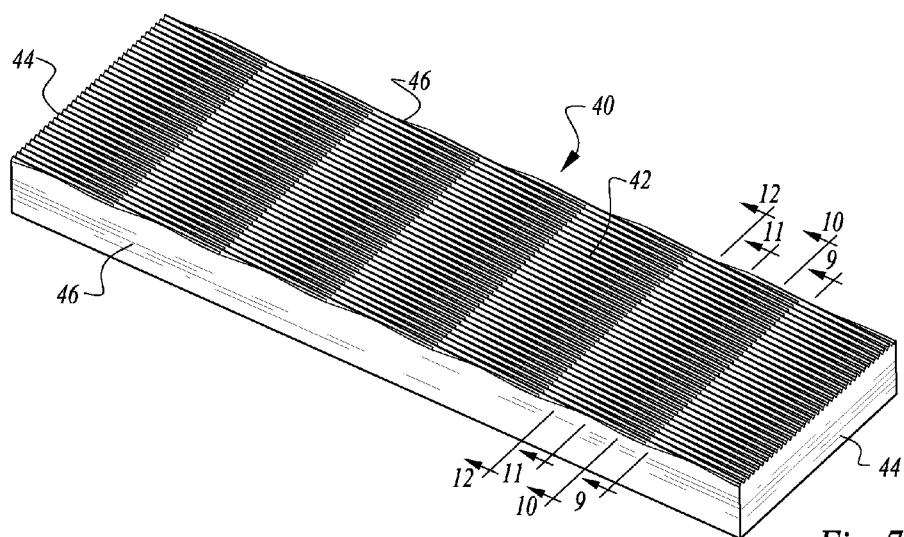
FIG. 7 is a perspective view of a dual threaded die formed by the method of this invention and suitable for use in roll forming of dual threaded screws therewith.
Figure 8:
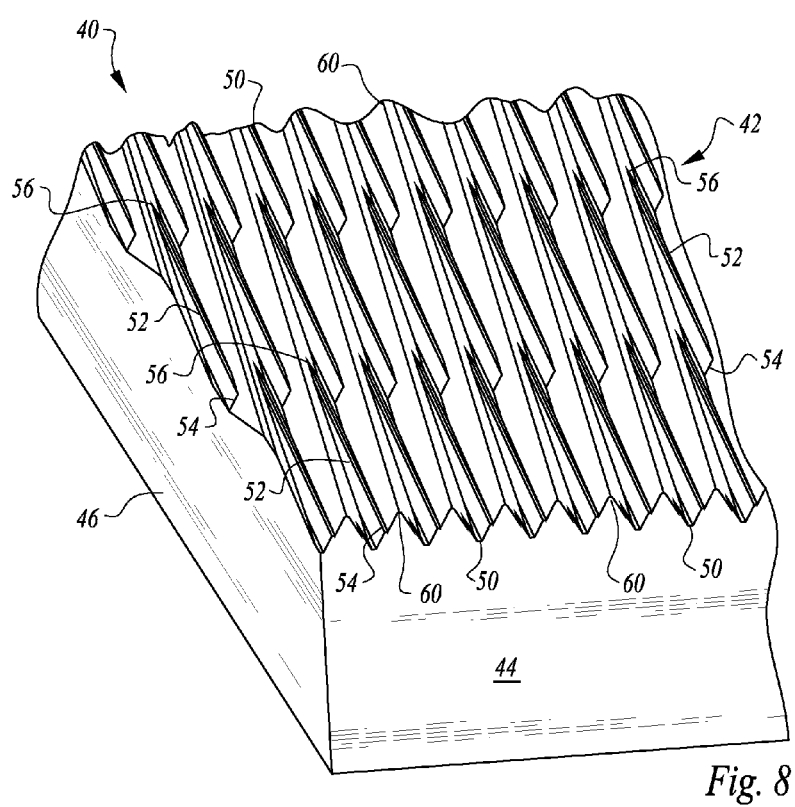
FIG. 8 is a detailed perspective view of a portion of that which is shown in FIG. 7.

With this invention a method is provided for forming a dual threaded roll forming die 40. The dual threaded die 40 has a configuration particularly contoured to allow the die to roll form a dual threaded screw such as a dual threaded bolt B (FIGS. 20-25). The method of forming the dual threaded die 40 involves utilizing an Electric Discharge Machining (EDM) apparatus having an EDM electrode 10 which is contoured so that it can shape the dual threaded die 40 with the forming surface 42 required so that it can roll form dual threaded screws such as the dual threaded bolt B. A method for forming the EDM electrode 10 is also disclosed.

Preliminarily, and with reference to FIGS. 20-25, basic details of the dual threaded bolt B are described, defining one embodiment of a dual threaded screw formable by roll forming with a dual threaded die such as the die 40 also described herein. The dual threaded bolt B is characterized by having both a coarse thread C and a fine thread F on a common shaft S extending between a head H and a tip T of the bolt B. The coarse thread C and fine thread F each have pitch angles associated therewith which differ from each other. As an example, the coarse thread C might have a pitch angle of 10° and the fine thread F might have a pitch angle of 5°. Most typically, the coarse thread C will have a pitch angle which matches some standard in the art for coarse threaded bolts. The fine thread F will then have a pitch angle which is exactly half of the pitch angle of the coarse thread C.

A nut N is provided with a female coarse thread matching the coarse thread C on the dual thread bolt B. A lock nut L is provided with a fine female thread which matches the fine thread F on the dual threaded bolt B. The female threads of the nut N coact with the coarse thread C on the dual threaded bolt B to advance the nut N, by rotation along a central axis of the shaft S. The lock nut L has its fine female threads coact with the fine threads F which are formed into portions of the coarse threads C so that the lock nut L can also advance by rotation along the central axis of the shaft S.

A similar number of turns for the nut N and the lock nut L will cause the nut N to advance twice as far as the lock nut L. When the lock nut L is advanced toward the nut N while the nut N is stationary, the lock nut L will tighten against the nut N and tend to cause both the nut N and lock nut L to both be securely held to the shaft S of the bolt B.

With particular reference to FIGS. 7-12, details of the dual threaded die 40 are described, according to this preferred embodiment. This dual threaded die 40 largely has geometry details similar to those disclosed in U.S. Pat. No. 7,159,429, incorporated herein by reference in its entirety. The die 40 has a forming surface 42 parallel and opposite a rear. A pair of lead edges 44 are provided on opposite ends of the forming surface 42 and extend from the forming surface 42 down to the rear. A pair of side edges 46 are parallel and opposite each other and extend from the forming surface 42 down to the rear and also extend between the lead edges 44. The die 40 thus has a generally orthorhombic structure with three pairs of mutually parallel sides which are perpendicular to the other pairs of sides.

The forming surface 42 defines that portion of the die 40 which acts upon the shaft S of the bolt B or other screw with sufficient pressure and rolling motion to cause the coarse thread C and fine thread F to be simultaneously formed into the shaft S of the bolt B. In particular, this forming surface 42 includes a root 50 and crest 60 which each extend between the two lead edges 44 and are provided in an alternating pattern between the two side edges 46. The root 50 and crest 60 are not oriented entirely parallel with the side edges 46 in this preferred embodiment. Rather, they are angled with this angle of the root 50 and crest 60 relative to the side edges 46 being similar to a pitch angle of the coarse threads C of the bolt B. As an alternative, the root 50 and crest 60 could be parallel with the side edges 46 or angled different than an angle of the coarse thread C pitch angle, provided that when the die 40 is used to form the dual threaded bolt B, the shaft S central axis is not oriented perpendicular to the side edges 46, but rather has an appropriate angle to the side edges 46 so that the desired pitch angle for the coarse threads C is provided.

The crest 60 of the die 40 is preferably substantially unaltered by portions of the forming surface 42 which are provided to form the fine thread F on the dual threaded bolt B. The root 50 is interrupted by contours of the forming surface 42 which are provided to form the fine threads F on the dual threaded bolt B. In particular, each root 50 includes a plurality of bridges 52 spanning the root 50. Each bridge 52 extends from a start 54 to a stop 56. The start 54 is on one side of the root 50 and the stop 56 is on an opposite side of the root 50. Thus, the start 54 extends out of one crest 60 adjacent the root 50 and the stop 56 ends into a crest 60 on an opposite side of the root 50. Extending down the root 50 another bridge 52 preferably has a start 54 which is provided before the stop 56 of the previous bridge 52. Thus, there is some overlap between each bridge 52 within each root 50.

These bridges 52 preferably have a highest portion thereof which is substantially flat and parallel with the rear and similar to an average elevation of the forming surface 42 away from the rear. The bridges 52 preferably have an angle relative to the root 50 which is similar to a difference between the pitch angle of the coarse thread C and a pitch angle of the fine thread F. Where the pitch angle of the coarse thread C is matched by an angle of the root 50 relative to the side edges 56 of the die 40, the bridges 52 also have an angle relative to the side edges 46 which matches a pitch angle for the fine thread F of the dual threaded bolt B. Stated alternatively, the bridges 52 have an angle that is closer to parallel with the side edges 46 than the root 50 angle.

Figure 9:
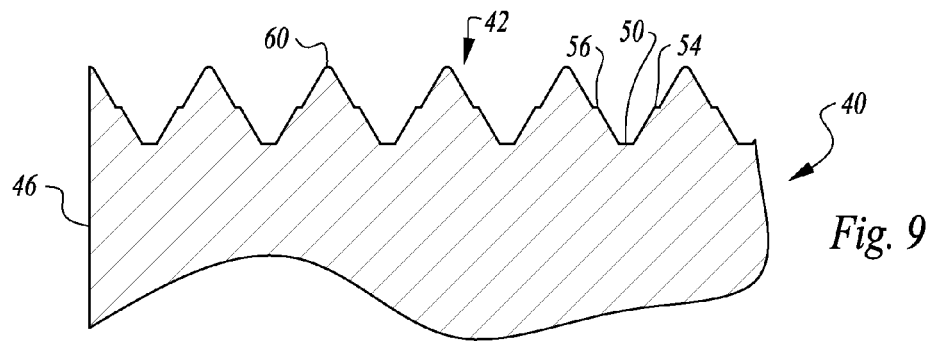
FIGS. 9-12 are sectional views of portions of that which is shown in FIG. 7, the views taken along corresponding lines of FIG. 7 and further revealing details of the contour of a forming surface of the dual threaded die formed by the method of this invention.
Figure 10:
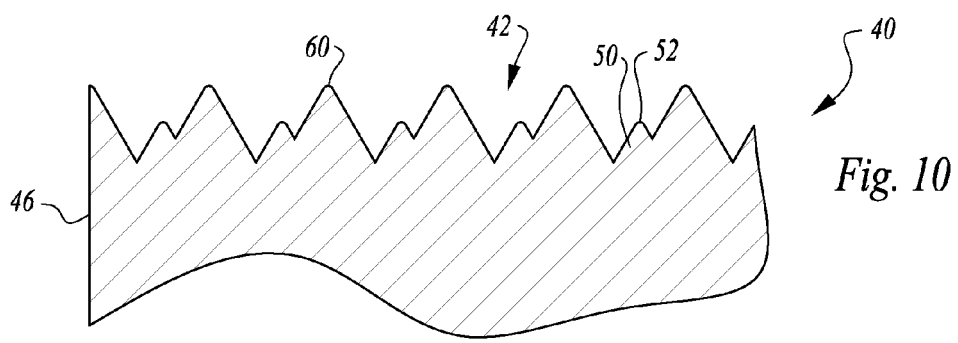
Figure 11:
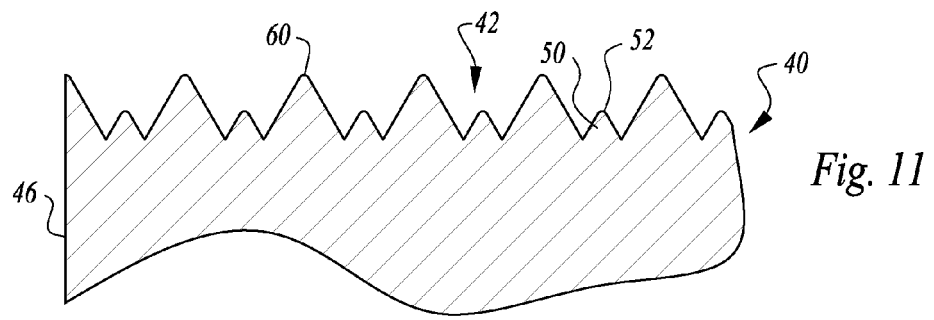
Figure 12:
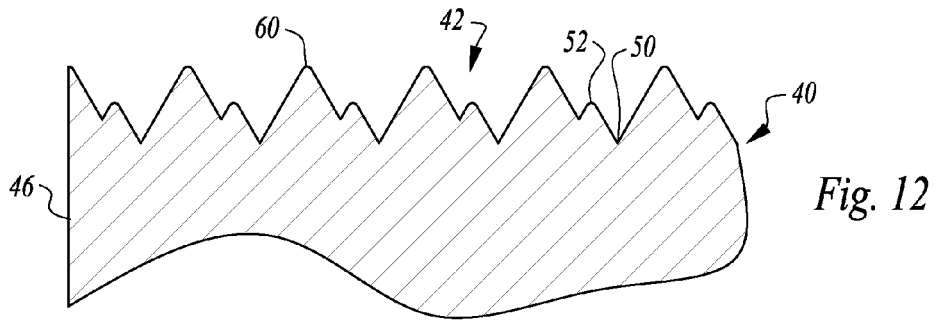

The particular contour of the bridge 52 is further exemplified by the series of sectional views shown in FIGS. 9-12. In FIG. 9, a root 50 can be seen with a start 54 on a right side of the root 50 and a stop 56 of a previous bridge 52 on a left side of the root 50. In FIG. 10 it can be seen that the bridge 52 has extended further from the right side of the root 50 and the previous bridge 52 is no longer visible. In FIG. 11 it can be seen that the bridge 52 is now midway between the right side of the root 50 and the left side of the root 50. In FIG. 12 it can be seen that the bridge 52 is now closer to the left side of the root 50 than the right side. A next sequential view after FIG. 12 would be similar to FIG. 9, where a stop 56 of a bridge 52 is seen adjacent the left side as well as a start 54 of another bridge 52 on the right side and further down the same root 50.

In a preferred embodiment the bridge 52 has a height which is substantially half of a height of the crest 60 above the root 50. Other relative heights of the bridge 52 could be provided, depending on the desired height for the fine thread F extending into the coarse thread C.

Figure 18:
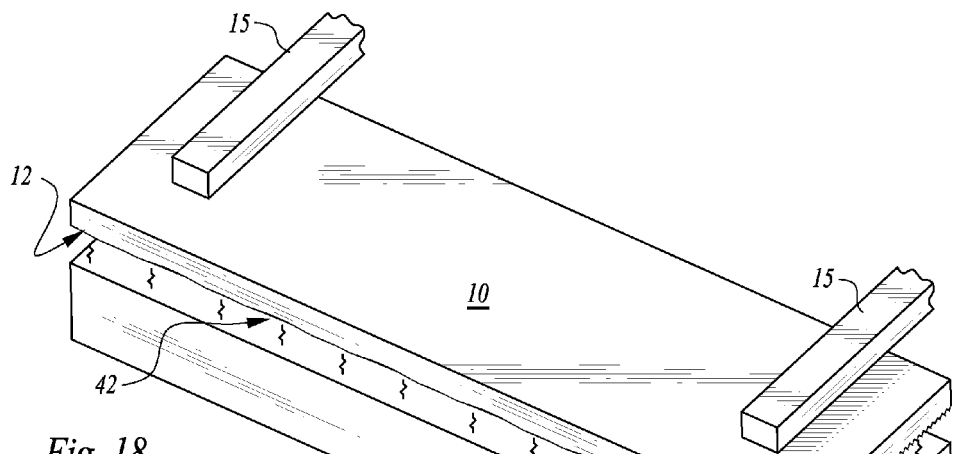
FIG. 18 is a perspective view showing the EDM electrode in use to shape the forming surface of the dual threaded die according to a method of this invention.
Figure 19:
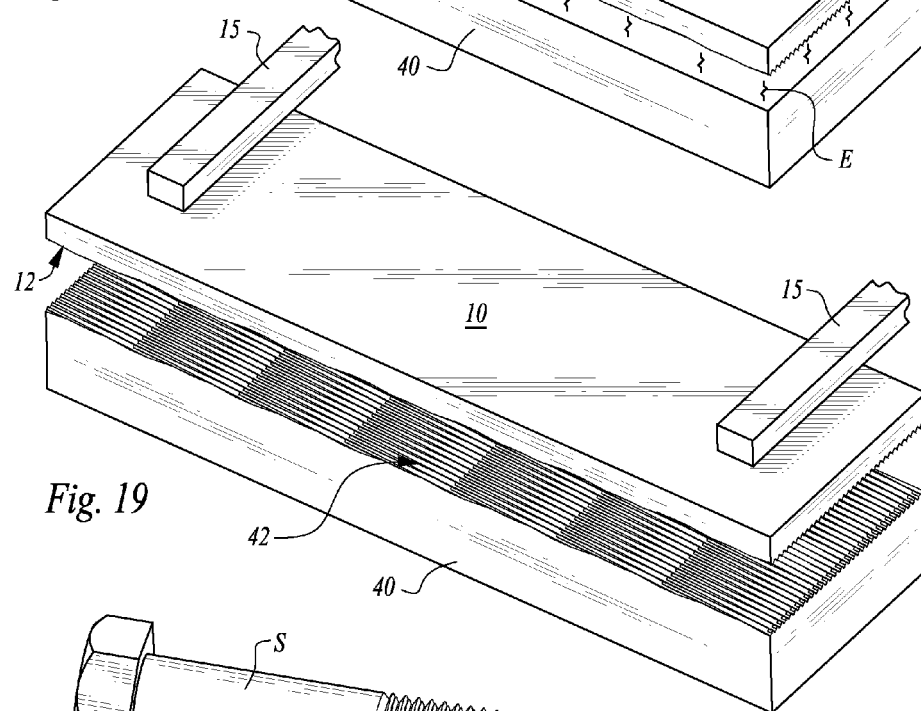
FIG. 19 is a perspective view similar to that which is shown in FIG. 18 but after completion of the dual threaded die forming process.
Figure 20:
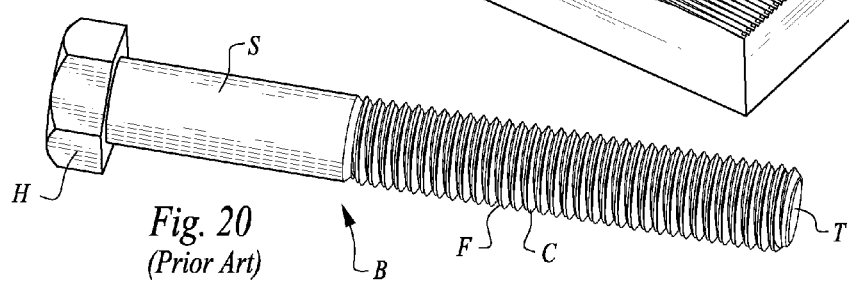
FIG. 20 is a perspective view of a dual threaded bolt defining one form of dual threaded screw formable utilizing the dual threaded die which is formed by a method of this invention.

With this invention, the dual threaded roll forming die 40 is formed by an electric discharge machining (EDM) process to provide the die 40 with the desired contour for the forming surface 42, as described above. This EDM process is generally depicted in FIGS. 18 and 19. The EDM electrode 10 is provided within an appropriate support 15 of the EDM machine adjacent the die 40. The face 12 of the EDM electrode 10 is directly adjacent the forming surface 42 of the die 40. Utilizing the EDM machine, electric discharge E occurs between the EDM electrode 10 and the die 40, causing portions of the forming surface 42 of the die 40 to be vaporized and removed. The contour of the EDM electrode 10 face 12 is such that the desired contour for the forming surface 42 is shaped into the die 40 by the EDM machine operation. After completion of the process, the forming surface 42 of the die 40 is contoured as described above (FIG. 19).

The EDM electrode 10 is uniquely configured so that it will cause the die 40 to have the desired shape described above. In particular, the EDM electrode 10 is a generally orthorhombic structure in many ways similar to the structure of the die 40, but in subtle ways also different. The EDM electrode 10 includes a substantially planar face 12 parallel and opposite a back 18. A pair of primary edges 14 are parallel and on opposite sides of the face 12 and a pair of side edges 16 are parallel each other and on opposite sides of the face 12, and generally extending between the primary edges 14. The EDM electrode 10 is a generally orthorhombic structure with three pairs of parallel sides which are each mutually perpendicular to the other pairs of sides. The face 12 defines that portion of the EDM electrode 10 which has the contour required to cause the forming surface 42 of the die 40 to be shaped as desired.

In particular, the face 12 of the EDM electrode 10 includes a plurality of alternating troughs 20 and tips 30 therein extending between the two side edges 16 of the face 12. The troughs 20 and tips 30 are preferably angled relative to the side edges 16 by an angle matching a pitch angle of the coarse thread D on the dual threaded bolt B. A height differential between the troughs 20 and tips 30 is generally similar to a height differential desired for the die 40 between the root 50 and crest 60 in the forming surface 42. The troughs 20 are preferably substantially unaltered from a desired contour matching a cylindrical projection of the coarse thread C minor diameter for the dual threaded bolt B.

The tips 30 are interrupted by a series of grooves 32 within each tip 30. Each groove 32 includes a beginning 34 opposite an ending 36. Preferably, the beginning 34 of each groove 32 overlaps somewhat with the ending 36 of a previous groove 32 within each tip 30. Thus, the grooves 32 within each tip 30 preferably overlap somewhat. The groove 32 preferably has a constant depth extending into the tip 30. An angle of each groove 32 relative to the tip 30 is preferably similar to a difference between a pitch angle of the coarse thread C and a pitch angle of the fine thread F for the dual threaded bolt B to be formed by the die 40 that is shaped by the EDM electrode 10.

In a preferred embodiment the trough 20 and tip 30 are angled relative to the side edges 16 by an angle similar to the pitch angle of the coarse thread C. In this preferred embodiment the grooves 32 are angled relative to the side edges 16 at an angle matching a pitch angle of the fine threads F. As an alternative, some other angular orientation could be provided if the die 40 roll forms screws with shafts S (FIGS. 20 and 21) oriented non-perpendicular to the side edges 46 (FIG. 7) of the die 40.

As can be seen, the grooves 32 have a contour which follows a contour of the bridges 52 to be formed extending across the roots 50 in the forming surface 42 of the dual threaded die 40. Overall, the EDM electrode 10 has its face 12 provided with a contour which corresponds with a contour of the forming surface 42 of the dual threaded die 40. This correspondence between the face 12 and forming surface 42 is such that the EDM electrode 10 can have its face 12 brought down into contact with the forming surface 42 of the dual threaded die 40 and contact occurs substantially at all points on the face 12 and the forming surface 42. In one sense, the EDM electrode 10 is provided with a face 12 contour which is a cylindrical projection of a desired contour for the coarse threads C and fine threads F on the dual threaded bolt B or other screw to be roll formed.

Figure 13:
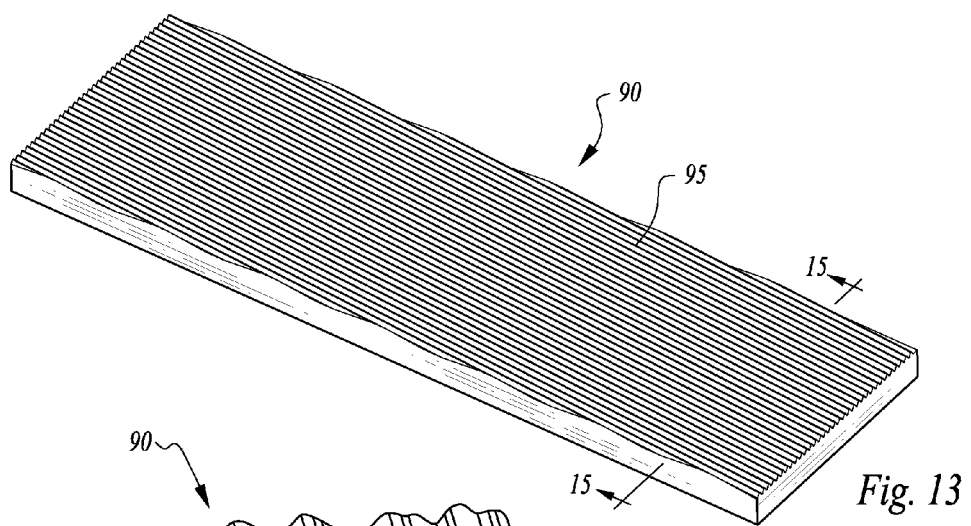
FIG. 13 is a perspective view of a standard coarse thread die for use with the die of FIG. 7 in forming a dual threaded screw.
Figure 14:
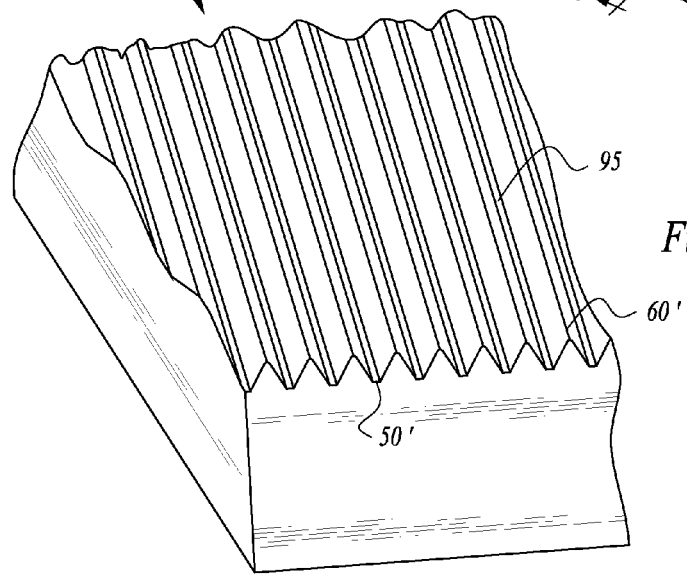
FIG. 14 is a detailed perspective view of a portion of that which is shown in FIG. 13.
Figure 15:
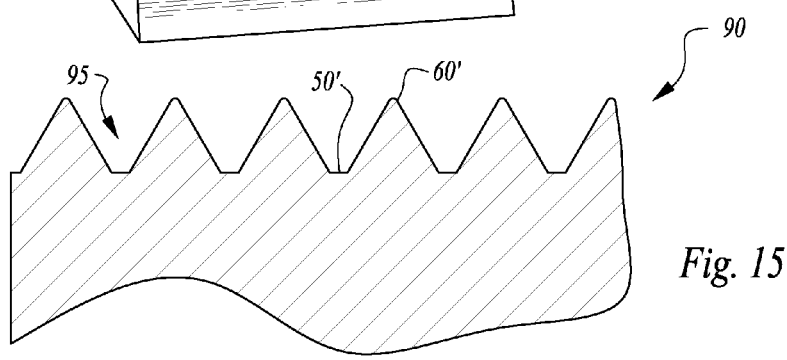
FIG. 15 is a sectional view of a portion of that which is shown in FIG. 13, taken along line 15-15 of FIG. 13.

With reference to FIGS. 13-15, details of a standard die 90 are disclosed. The standard die 90 is preferably provided for use along with the die 40 to roll form screws between the two dies 40, 90. As an alternative, two similar dual threaded dies 40 could be used. The standard die 90 has only coarse threads 95 thereon and can be formed in known ways to exhibit the roots 50' and the crests 60'.

Figure 16:
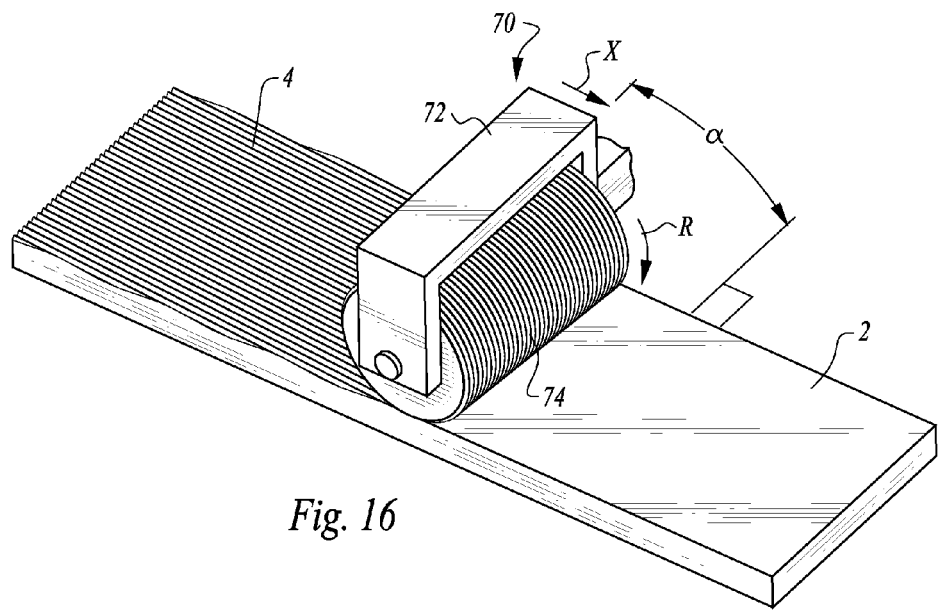
FIG. 16 is a perspective view of an EDM electrode blank in the process of being formed into an EDM electrode, by having troughs ground thereinto.
Figure 17:
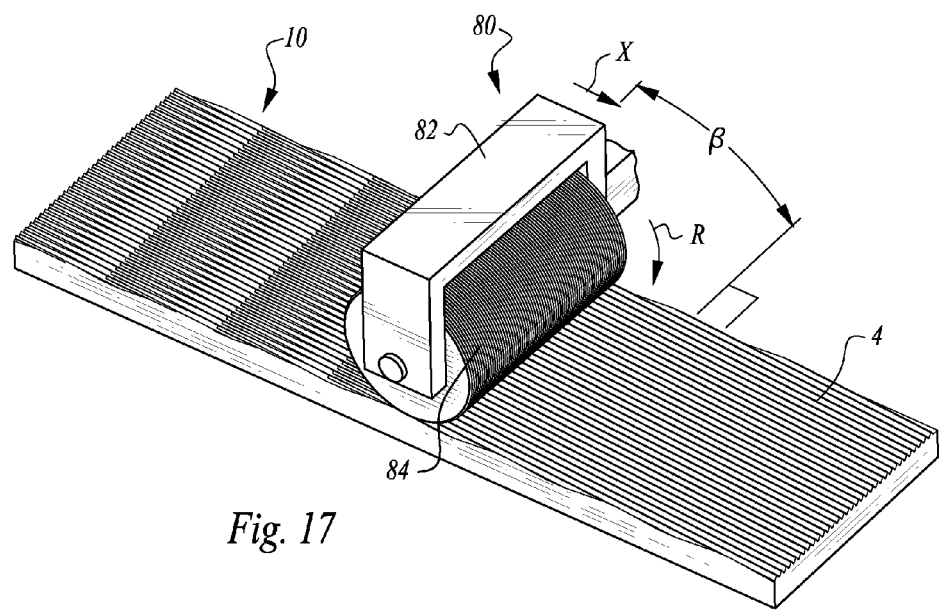
FIG. 17 is a perspective view similar to that which is shown in FIG. 16 but after the EDM electrode blank has been partially ground to have the troughs formed therein and being further ground to form grooves in tips between the troughs to produce the final EDM electrode face as desired according to this invention.

With particular reference to FIGS. 16 and 17, details are provided for the method of forming the EDM electrode 10 to have the face 12 with the contour described above. Initially, an EDM electrode blank 2 is provided formed of the appropriate EDM electrode material, but with a face 12 which is substantially planar and without the desired contour. A coarse grinder 70 is utilized to form the troughs 20 and tips 30 into this EDM electrode blank 2. The coarse grinder 70 includes a coarse drum 74 of cylindrical shape rotatably mounted about a rotating axis to a support 72. The coarse drum 74 is preferably angled with a rotating axis thereof angled about angle α relative to the side edges 16 of the EDM electrode 10.

The coarse drum 74 has a plurality of parallel coarse ribs thereon which are circumferentially formed on the drum 74. By angling the drum 74 of the coarse grinder 70, the desired angle for the troughs 20 and tips 30 is provided. The coarse grinder 70 is translated, along arrow X of FIG. 16 while simultaneously rotating, along arrow R of FIG. 16. The coarse ribs grind the troughs 20 into the face 12 of the EDM electrode 10. Once the coarse grinder 70 has completed its pass (or multiple passes) between the primary edges 14, the EDM electrode blank 2 has been converted into a partially ground EDM electrode 4 which has the troughs 20 formed therein and with tips 30 between the troughs 20 which do not yet have grooves 32 therein.

Next, a fine grinder 80 is provided having a form similar to that of the coarse grinder 70, but with a fine drum 84 thereon. The fine drum 84 is generally cylindrical in form rotatably supported upon a rotating axis to a support 82. The fine drum has a plurality of parallel fine ribs therein circumferentially formed to grind the grooves 32 in the tips 30. A height of the fine grinder 80 is carefully controlled to control a depth of the grooves 32. An angle of the fine grinder 80 is set at angle β relative to the side edges 16 of the EDM electrode 10 so that the grooves 32 will have the desired angle relative to the side edges 16. When the fine grinder 80 has completed its pass (or passes) from between the two primary edges 14, the tips 30 have had a plurality of grooves 32 formed therein and the EDM electrode 10 is ready for use in forming the dual threaded die 40.

While the EDM electrode 10 is shown herein formed by the process of utilizing grinders 70, 80 to provide the troughs 20, tips 30 and grooves 32 within the tips 30, other processes could be utilized to form the EDM electrode 10. For instance, the EDM electrode 10 could be formed by molding, machining with an end mill, or grinding with grinding tools having a shape different than that of the cylindrical drums depicted herein.

The material utilized for the EDM electrode 10 and details of the EDM machine and spacing between the EDM electrode 10 and dual threaded die 40 within the EDM machine are all selected matching the various embodiments for operation of EDM machines. One EDM electrode 10 can be utilized for forming multiple dual threaded dies 40. Should the EDM electrode 10 become damaged or wear out from use, new EDM electrodes 10 can be formed.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure.

What is claimed is:

1. A method for forming a dual threaded die with a forming surface having a fine thread forming structure at a different pitch angle than a coarse thread forming structure, the die suited to roll form a screw having a dual threaded form including a coarse thread and a fine thread at different pitch angles, the method including the steps of:
   forming an EDM electrode to have a face with a geometry including:
      a plurality of troughs and tips matching a cylindrical projection of a coarse thread geometry of the screw;
      a plurality of grooves cutting across each tip, the grooves matching a fine thread geometry of the screw;
      the grooves angled relative to the tips by an angle matching a difference between the pitch angle of the coarse thread and the pitch angle of the fine thread;
   locating the EDM electrode face adjacent to the forming surface of the die;
   shaping the forming surface of the die by electric discharge machining via the EDM electrode;
   wherein said forming step includes grinding the troughs into the face of the EDM electrode to match the coarse thread geometry of the screw;
   wherein said grinding includes contacting the face of the EDM electrode with a rotating grinding drum having grinding ribs thereon;
   wherein said grinding includes contacting the face of the EDM electrode with a rotating grinding drum having grinding ribs thereon;
   wherein said grinding includes the grinding ribs oriented in parallel circumferential rows, each extending around a circumference of the drum; and
   wherein said grinding includes a central axis of the drum being angled relative to side edges of the EDM electrode to match the pitch angle of the coarse thread of the screw.

2. The method of claim 1, wherein said grinding includes further grinding grooves into the tips of the face of the EDM electrode to match the fine thread geometry of the screw.

3. The method of claim 2 wherein said further grinding includes rotating a fine grinding drum having a plurality of circumferential rows of grinding ribs extending around a circumference of the fine grinding drum, said further grinding including angling the fine grinding drum to match the pitch angle of the fine thread of the screw, the pitch angle of the fine thread distinct from the pitch angle of the coarse thread.

4. The method of claim 1, wherein said locating step includes placing the face of the EDM electrode parallel with the forming surface of the die.

5. The method of claim 4, wherein said shaping step includes vaporizing portions of the die to cause the forming surface of the die to match the face of the EDM electrode.

6. A method of forming an EDM electrode suited to shape a dual threaded die having a forming surface with a fine thread forming structure at a different pitch angle than a coarse thread forming structure, the die suited to roll form a screw having a dual threaded form including a coarse thread and fine thread at different pitch angles, the steps for forming the EDM electrode including:
   forming a plurality of troughs and tips into a face of the EDM electrode, with the troughs and tips matching a cylindrical projection of a coarse thread geometry of the screw;
   forming a plurality of grooves cutting across each of the tips in the face, the grooves matching a fine thread geometry of the screw, the grooves angled relative to the tips by an angle matching a difference between the coarse thread pitch angle and the fine thread pitch angle;
   wherein said forming a plurality of troughs and tips includes grinding the troughs into the face of the EDM electrode to match the coarse thread geometry of the screw;
   wherein said forming a plurality of grooves includes further grinding grooves into the tips in the face of the EDM electrode to match the fine thread geometry of the screw;
   wherein said grinding includes contacting the face of the EDM electrode with a rotating grinding drum having grinding ribs thereon;
   wherein said grinding includes a central axis of the drum being angled relative to side edges of the EDM electrode to match the pitch angle of the coarse thread of the screw.

7. The method of claim 6, wherein said forming a plurality of grooves includes the grooves having a beginning at a first end of the grooves and an ending at a second end of the grooves opposite the first end, with the grooves continuous between the beginning of the grooves and the ending of the grooves; and
   wherein the plurality of grooves are provided on each tip of the EDM electrode.

8. The method of claim 6, wherein said grinding includes further grinding grooves into the tips in the face of the EDM electrode to match the fine thread geometry of the screw.

9. The method of claim 8, wherein said further grinding includes rotating a fine grinding drum having a plurality of circumferential rows of grinding ribs extending around a circumference of the fine grinding drum, said further grinding including angling the fine grinding drum to match the pitch angle of the fine thread of the screw, the pitch angle of the fine thread distinct from the pitch angle of the coarse thread.

10. The method of claim 6, wherein said locating step includes placing the face of the EDM electrode parallel with the forming surface of the die.

11. The method of claim 10, wherein said shaping step includes vaporizing portions of the die to cause the forming surface of the die to match the face of the EDM electrode.

* * * * *